Patented May 6, 1941

2,240,964

UNITED STATES PATENT OFFICE 2,240,964

SOLVENT AND PROCESS FOR DEWAXING MINERAL OILS

Sijbren Tijmstra, Berkeley, and Donald S. McKittrick, Oakland, Calif., assignors to Shell Development Company, San Francisco, Calif., a corporation of Delaware No Drawing. Original application July 17, 1934, Serial No. 735,626. Divided and this application October 23, 1939, Serial No. 300,802

5 Claims. (Cl. 196—18)

This invention relates to a process for separating from mineral oils various waxy substances occurring therein. More particularly, it pertains to a diluent for decreasing the viscosity of the oil and the solubility of the wax, whereby the wax and the oil are separated more readily than has been possible heretofore. This application is a division of our copending application Serial No. 735,626, filed July 17, 1934 which has issued as U. S. Patent 2,191,136.

Mineral oils naturally contain varying amounts of waxy paraffins or petrolatum, hereinafter designated as waxes, which at normal temperatures are dissolved in the liquid hydrocarbons, but which solidify at lower temperatures. If these oils are to be used as lubricants at these low temperatures these waxy constituents tend to solidify and may cause the oil to resist flow. When the wax content is too low to impede the flow it may, nevertheless, cause cloudiness in the oil. It becomes necessary, therefore, to effect the removal of these waxy constituents.

The first step in such a process is the creation of conditions under which the wax has a minimum solubility in the phase containing the remainder of the oil. This wax probably contains aliphatic hydrocarbons and belongs to the group of components of petroleum which are the least soluble in selective solvents. The removal of wax may be accomplished by any of several methods.

In accordance with one method, the oil is chilled to a temperature substantially below that at which the wax solidifies and the wax is separated from the oil by mechanical means. As an improvement in such a process, it is common to add a non-selective diluent, such as liquefied normally gaseous hydrocarbons, light naphthas, etc., to the oil to reduce its viscosity and facilitate the mechanical separation.

In another method, a selective solvent is used, and the wax-free components of the oil are dissolved therein. This method necessitates the use of a solvent which is sufficiently selective to dissolve at a suitable temperature the oily components of the wax containing mixture without substantially dissolving the waxy components.

The most selective solvents, however, are not sufficiently soluble in even the non-waxy components for efficient dewaxing. To obviate the resulting difficulties, it was proposed to dilute the oil with a non-selective solvent which would dissolve the wax as well as the oil. A second solvent, often called an antisolvent, which was a poor solvent for wax, was added to the mixtures of the oil and the first non-selective solvent.

It is an object of our invention to provide a process for the efficient dewaxing of oil. It is a further object of our invention to provide a solvent mixture which is suitable for this process. Further objects of our invention are: To provide a solvent mixture which will produce an oil which has a pour point which is near to or even substantially below the temperature at which the wax is separated; to provide a solvent mixture which will cause the paraffin wax to separate in a much purer form and in a form in which it can be more readily separated from the oil, than has been possible with the solvents now known; to provide a solvent mixture which will overcome the disadvantages of solvents heretofore known, and which can be used on all types of mineral oils by a slight variation in the properties of its constituents. Other objects of our invention will be apparent to those skilled in the art from a reading of this specification.

We have discovered that nitromethane is particularly suitable as a solvent for dewaxing mineral oils. It is preferably employed together with one or more solubility-enhancing solvents. The solubility-enhancing solvent should preferably be a good solvent both for oil and for nitromethane, although it need not be completely miscible with nitromethane or with the oil in all proportions. Of the many substances which can be used as solubility-enhancing solvents, those should desirably be selected which have a low solubility for wax. While a degree of selectivity of the secondary solvent is not an absolute requirement, it will be found that a greater efficiency often results when a fairly selective solvent is used. For example, butyl alcohol usually gives better results than hexane or benzol.

The following are examples of suitable solubility-enhancing solvents:

I. Aliphatic alcohols, aldehydes, acids, ethers, methyl ethyl or higher symmetrical or mixed ketones, and sulfur analogues of the above oxygenated aliphatic compounds, all containing not more than twelve carbon atoms in the molecule.

*Examples.*—Primary butyl alcohol, secondary butyl alcohol, isopropyl alcohol, propylaldehyde, diethyl acetone, diethyl ether, diethyl thioether.

II. Carbon bisulfide, aliphatic aminese, esters of lower fatty acids and lower alcohols containing more than four and not more than twelve carbon atoms in the molecule, branched chain and cyclic aliphatic hydrocarbons (containing not more than twelve carbon atoms in the molecule), polycyclic (and particularly bicyclic) aromatic hydrocarbons, such as naphthalene and its homologues, preferably dissolved in benzol or its homologues or equivalents.

Although the solubility-enhancing solvents are set forth in the foregoing groups, we have found that certain of these substances are more suitable than others. The following constitute the preferred sub-group: Butyl, amyl, and hexyl alcohols (secondary, tertiary, normal, or iso-); ethyl, propyl, isopropyl, butyl, and isobutyl ethers; carbon disulfide; aliphatic amines; and isopentane.

With regard to the relative efficiency of the alcohols, better results are usually obtained with secondary alcohols than with primary alcohols, and still better results with tertiary alcohols. The alcohols of low molecular weights are not very soluble in mineral oils, so that when operated at low temperatures, it is preferable to use amyl and/or hexyl or higher alcohols.

The method which is the subject of our invention relies primarily on the peculiar properties of mixtures of solvents, at least one of which possesses selective properties, to create a medium in which there is a large difference in solubility of the different components of oil and especially between the solubility of the solid or waxy components and the solubility of the liquid or non-waxy components.

In one aspect, this method, therefore, comprises the steps of mixing oil containing wax with a selective solvent mixture, and chilling to a temperature which is below the melting point of the highest melting components of the wax to be removed and separating precipitated wax at this temperature. This will result in the removal of not only those components of wax which are normally solid at the temperature at which separation occurs but also of some of those which have melting points which are below that temperature.

It is desirable, although not essential, to produce a homogeneous oil-solvent system prior to the precipitation step. To achieve this, the temperature of the system may initially be raised to somewhat above the dewaxing temperature. In this event the oil-solvent mixture must be chilled to the temperature necessary to solidify certain portions of the wax, as explained above. Some of our dewaxing mixtures may, however, be used at ordinary temperatures, and require no chilling.

The chilling, when used in this process, is not only for the purpose of merely freezing out the wax, as in the processes now practiced, but also for the purpose of increasing the selectivity of the solvent mixture which may have been added to the oil at a temperature at which it is less selective. This feature distinguishes our process from those in which the wax is caused to separate by mere chilling, and a non-selective solvent or diluent is added to reduce the viscosity of the oil and expedite the separation of the solidified wax.

After the oil-solvent system of the proper temperature has been created, the waxy constituents are separated from the liquid phase by means of any appropriate mechanical means, as filtering, settling or centrifuging. Under certain conditions the wax which is precipitated according to the procedure outlined above, either with or without chilling during precipitation, may be so soft as to make its separation difficult. It is then advantageous to chill the precipitated wax during or just prior to its final removal to harden it. Subsequently, the solvent mixture is removed from the separated phases by any means, such as distillation.

In operating according to the method of our invention it becomes possible to precipitate the wax in a form in which it can be removed more readily, particularly by filtration. When oil which does not contain a solvent or diluent is chilled to separate out the wax, the latter often assumes an amorphous form known as petrolatum. Separation by filter pressing is obviously extremely difficult. The same results may be obtained when a diluent is used which exercises no selective solvent action. When, however, the wax is precipitated from an oil in the process of our invention, the wax will generally separate out in filterable particles.

To be filterable or otherwise separable from the oil-solvent phase, these particles of wax must be of suitable size and strength and/or hardness. We have found that if in precipitating the wax a very small amount of liquid oil is separated out from the oil with the wax crystals, clusters of crystals are formed and the separation of the wax from the solution of the oil and solvent is facilitated. The amount of oil necessary for this purpose depends on the size of the wax crystals. In processes in which the crystals are extremely small and the wax content of the initial oil is high, as much as 1.0% of the main body of the oil may be desirable. When the crystals are larger in size or smaller in amount, lesser amounts of oil may be desirable, and it is frequently practical to permit no oil to be separated out with the wax. If more than such a small quantity of oil is lost to the wax, the yield of the wax-free oil will be decreased and the precipitated wax becomes difficult to separate. It will, therefore, often be desirable to precipitate a small amount of oil with the wax, but it is then necessary to control carefully the amount of oil which is to be carried away with the wax.

A convenient method of controlling this amount of oil is to control the quantity of the solubility-enhancing solvent in the solvent mixture. The necessary dilution ratio, i. e., ratio of the combined solvent mixture to the oil, is generally determined by the viscosity of the oil and the solvent and by the selectivity of the solvent at the dewaxing temperature, and is made as low as possible with a view of conserving the solvent. For this given dilution ratio, the greater the concentration of the nitromethane in the oil, the more complete will be the precipitation of wax. As was pointed out above, since pure nitromethane is not always sufficiently soluble in the oil, a solubility-enhancing solvent is added to achieve a homogeneous liquid phase. If more of this solvent than is required for homogeneity is added, this condition will still be retained. In this case the concentration of the nitromethane in the liquid phase for the given dilution ratio is not, however, at its maximum, although the dewaxing can be conducted under these conditions. It is desirable, for the purpose of increasing the nitromethane concentration, to use only that quantity of solubility-enhancing solvent as is required to insure the desired degree of solubility. If the minimum amount of solubility-enhancing solvent for complete solubility is used, substantially no oil will separate from the oil-solvent mixture when the oil-solvent mixture is chilled to precipitate wax. A good yield is produced and, under many conditions, this is the optimum quantity of solubility-enhancing solvent. But, as was pointed out above, it may often be difficult to separate the wax from the oil-solvent phase. Under these conditions, it is desirable to separate some oil with the wax. This may be accomplished by using less of the solubility-enhancing solvent. A very small quantity of oil is then lost, but the separation of the wax is made easier. This condition sometimes represents the optimum amount of solubility-enhancing solvent. Beyond this point a further reduction in the quantity of the solubility-enhancing solvent may at times be undesirable because of decreased yield and increased filtering difficulties.

When using the new solvent or solvent mixtures of our invention, the dilution ratio, mentioned above, may be much lower than the dilution ratio used with the known solvent mixtures. For example, excellent results have been obtained when using a dilution ratio of 2:1, and even lower ratios may at times be suitable. With the solvents and/or solvent mixtures of the prior art, much greater ratios are necessary.

As used in the claims, the term "sufficient to prevent the separation of free oil," as applied to the quantity of solubility-enhancing solvent, means the amount necessary to permit no more oil to be carried away with the wax than is necessary to form a readily separable wax. In situations in which no oil is needed to produce a readily separable wax, all oil not retained by the solvent is regarded as "free oil."

In another aspect, therefore, our invention comprises the steps of mixing oil containing wax with nitromethane and precipitating the wax at a desired temperature in the presence of a controlled quantity of a solubility-enhancing solvent so as to prevent more than certain small desired amounts of oil from separating from the solvent phase.

Another advantage of our process and solvent mixtures is that it becomes possible to obtain a pour point which is near to or, often substantially below the temperature to which the oil-solvent mixture is chilled. This makes it possible to operate at substantially higher temperatures than heretofore. It is to be understood, however, that our invention is not limited to operating at any particular temperature, inasmuch as the advantages of this process and of our new solvent compositions will be realized although the extraction is practiced according to the number of alternate procedures coming within the scope and spirit of our invention. In all of these, the wax separates as a result of the action of the selective solvent or solvents and not of simple freezing out.

To illustrate the improved results obtained by our new solvent mixtures, the following examples are set forth: Several portions of Ventura distillate oil having a pour point of 95° F. were diluted with 4 times their volumes of the solvent mixtures shown in the table. The solutions were cooled gradually to 0° C. and filtered at this temperature. The results are shown in the table:

| Experiment No. | Solvent | | Yield percent by volume | Pour point of dewaxed oil |
| --- | --- | --- | --- | --- |
|  | Nitromethane | Secondary butyl alcohol |  |  |
|  | Percent | Percent | Percent | °F. |
| 1 | 5 | 95 | 90 | 30 |
| 2 | 10 | 90 | 89 | 27½ |
| 3 | 20 | 80 | 88 | 27½ |

These examples are recited solely for the purpose of illustrating the efficiency of our new solvents, and not by way of limitation. Thus, the oil-solvent ratio may be varied within wide limits, according to the extent to which the mixture is soluble in the oil to be dewaxed, the yield of oil desired, etc. The only requirement is that the solubility-enhancing solvent be present in such a quantity that when the oil-solvent mixture is chilled to precipitate the wax, the oil will remain dissolved in the solvent mixture to such a degree that free oil will be substantially prevented from being carried away with the wax. The dewaxing may be conducted either as a continuous or a batch process. It is obvious also, that the ratio of the nitromethane to the solubility-enhancing solvent will vary with the solubility of the particular oil in nitromethane, and may be readily determined in any particular instance by those skilled in the art after a reading of this specification. By the term "effective quantity" as used in the claims, we mean a quantity of solvent mixture which will maintain sufficient oil in solution to produce its substantial separation from the wax which is precipitated, and which will produce an oil-solvent mixture of the desired viscosity.

We claim as our invention:

1. A selective dewaxing mixture for petroleum oils comprising nitromethane and a secondary or tertiary alcohol containing more than three and less than seven carbon atoms, said alcohol being present in an amount sufficient to prevent the separation of free oil from an oil-solvent mixture formed by adding an effective quantity of said dewaxing mixture to said petroleum oil when the oil-solvent mixture is chilled to a temperature at which the wax is precipitated therefrom.

2. A process for dewaxing mineral oils which comprises mixing said oil with nitromethane, chilling the resulting mixture to precipitate wax, and removing the precipitated wax from the oil-solvent mixture.

3. A process of dewaxing mineral oils which comprises mixing said oil with a dewaxing solvent comprising nitromethane and a solubility-enhancing solvent having high solvent power for oil and for nitromethane, chilling the resulting mixture to precipitate wax, and removing the precipitated wax from the oil-solvent mixture.

4. The process according to claim 3 wherein the solubility-enhancing solvent is a secondary or tertiary alcohol having more than three and less than seven carbon atoms.

5. The process according to claim 3 wherein the nitromethane and the solubility-enhancing solvent are taken in such proportions and quantity as to cause the cold test of the dewaxed oil not to be above the temperature at which the wax is separated from the oil-solvent mixture.

SIJBREN TIJMSTRA.
DONALD S. McKITTRICK.